United States Patent
Shell et al.

(10) Patent No.: US 7,188,243 B2
(45) Date of Patent: Mar. 6, 2007

(54) SYSTEM AND METHOD FOR OVER THE AIR CONFIGURATION SECURITY

(75) Inventors: Scott R. Shell, Redmond, WA (US); Lee M. Butler, Carnation, WA (US); Igor B. Peev, Seattle, WA (US); Yuhang Zhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 09/843,901

(22) Filed: Apr. 27, 2001

(65) Prior Publication Data

US 2002/0144151 A1 Oct. 3, 2002

Related U.S. Application Data

(60) Provisional application No. 60/269,737, filed on Feb. 16, 2001.

(51) Int. Cl.
- *H04L 9/32* (2006.01)
- *G06F 17/00* (2006.01)
- *G06F 7/06* (2006.01)
- *H04M 3/00* (2006.01)
- *G06F 15/177* (2006.01)
- *G06F 15/173* (2006.01)

(52) U.S. Cl. .................. 713/166; 726/14; 726/28; 455/419

(58) Field of Classification Search ........ 713/166; 726/14, 28; 455/419
See application file for complete search history.

(56) References Cited

U.S. PATENT DOCUMENTS

| | | | |
|---|---|---|---|
| 5,274,824 A * | 12/1993 | Howarth .................. 713/167 |
| 5,838,918 A | 11/1998 | Prager et al. ............... 395/200 |
| 6,023,620 A * | 2/2000 | Hansson ..................... 455/419 |
| 6,026,293 A * | 2/2000 | Osborn ....................... 455/411 |
| 6,088,457 A * | 7/2000 | Parkinson et al. .......... 380/270 |
| 6,148,342 A * | 11/2000 | Ho ............................. 709/225 |
| 6,161,139 A | 12/2000 | Win et al. ................... 709/225 |
| 6,223,028 B1 * | 4/2001 | Chang et al. ............... 455/419 |
| 6,259,908 B1 * | 7/2001 | Austin ........................ 455/411 |
| 6,301,484 B1 * | 10/2001 | Rogers et al. .............. 455/466 |

(Continued)

FOREIGN PATENT DOCUMENTS

| WO | WO 99/14965 | 3/1999 |
|---|---|---|
| WO | WO 00/78085 A1 | 12/2000 |

OTHER PUBLICATIONS

Chih-Lin I et. al. "PCS Mobility Management Using the Reverse Virtual Call Setup Algorithm" IEEE/ACM Transactions on Networking vol. 5 No. 1 Feb. 1997, pp. 13-24.*

*Primary Examiner*—Ayaz Sheikh
*Assistant Examiner*—Matthew Henning
(74) *Attorney, Agent, or Firm*—Merchant & Gould P.C.; Ryan T. Grace

(57) ABSTRACT

A system and method for assigning security credentials to particular components within a mobile device, and for ensuring that only configuration messages having sufficient access privilege to those components are allowed access, based on the security credentials. The security credentials or "roles" describe which settings a particular configuration message has authority to modify or query. Access is disallowed to settings for which a message does not have adequate security credentials.

13 Claims, 6 Drawing Sheets

U.S. PATENT DOCUMENTS

| | | | |
|---|---|---|---|
| 6,393,270 B1 * | 5/2002 | Austin et al. | 455/411 |
| 6,480,963 B1 * | 11/2002 | Tachibana et al. | 726/4 |
| 6,496,936 B1 * | 12/2002 | French et al. | 726/7 |
| 6,584,376 B1 | 6/2003 | Van Kommer | 700/245 |
| 6,741,851 B1 * | 5/2004 | Lee et al. | 455/410 |
| 6,788,959 B2 * | 9/2004 | Jokinen et al. | 455/552.1 |
| 6,912,256 B1 * | 6/2005 | Noblet | 375/260 |
| 6,915,426 B1 * | 7/2005 | Carman et al. | 713/168 |
| 6,978,381 B1 * | 12/2005 | Te et al. | 705/54 |

* cited by examiner

CONFIGURATION MESSAGE ⟍ 122

```
<HEADER>
    <VERSION>2.0</VERSION>
    <SOURCE>PROVISIONING SERVER</SOURCE>
    <TRANSPORT>SMS</TRANSPORT>
</HEADER>
<CONFIGURATION>
    <CSP A>
        <SETTING ONE>XXX</SETTING ONE>
    </CSP A>
    <CSP B>
        <SETTING TWO>YYY</SETTING TWO>
    </CSP B>
</CONFIGURATION>
<PARM NAME = SECURE-ROLE VALUE = X>
```

510 — `<HEADER>`
512 — `<SETTING ONE>XXX</SETTING ONE>`
514 — `<SETTING TWO>YYY</SETTING TWO>`
516 — `<PARM NAME = SECURE-ROLE VALUE = X>`

| METABASE | | | | | |
|---|---|---|---|---|---|
| SOURCE | ROLE | CSP | ROLE | SETTING | ROLE |

406

601 — 603 — 605

SYSTEM AND METHOD FOR OVER THE AIR CONFIGURATION SECURITY

RELATED APPLICATIONS

This application claims the benefit under 35 U.S.C. § 119(e) of U.S. provisional application No. 60/269,737, filed Feb. 16, 2001.

BACKGROUND OF THE INVENTION

The use of mobile electronics is growing by leaps and bounds. Mobile devices, such as cellular phones and personal digital assistants, are transforming from relatively-simple single-function devices into complex devices with both telephone and PDA capabilities. With these improvements comes a greater need for configurability and maintenance. Often, configuration settings stored on the mobile device need to be changed. For instance, a service provider may have a need to change a subscribers configuration settings in response to a change in service, or a setting related to an e-mail application on the device may need modification.

Recent advancements in technology have enabled provisioning systems to pass down configuration changes to a mobile device. However, these advancements have created new security concerns. For instance, mobile device users are concerned about the risk that a malicious entity could issue remote queries and discover various sensitive settings stored on their mobile devices, such as addresses of trusted proxy servers, information for creating symmetric encryption keys, and the like. Or worse still, hackers could possibly discover personal information, such as financial or contact information, stored on the mobile device. Until now, a solution to these security issues has eluded those skilled in the art.

SUMMARY OF THE INVENTION

Briefly described, the present invention includes mechanisms for assigning security credentials to particular components within a mobile device, and for ensuring that only configuration messages having sufficient access privilege to those components are allowed access, based on the security credentials. The security credentials or "roles" describe which settings a particular configuration message has authority to modify or query. Access is disallowed to settings for which a message does not have adequate security credentials.

In one aspect, an identifier is provided for each of a plurality of message sources that may transmit configuration messages to the mobile device. The identifiers are associated with particular security roles which define particular settings or groups of settings which are accessible to the transport. For example, an SMS message received over an SMS transport may be assigned a security role allowing access to SMS-related settings, but not allowing access to non-SMS related settings. Once a message is received by a particular transport (and possibly after authentication if performed), that message is tagged with the security role of the particular sender. The message is then passed to a configuration handler for processing. During processing, the configuration manager determines which configuration settings are affected by the message, and compares the security role of the message to a security role associated with the affected configuration settings. If the message's security role allows access to the configuration settings (as described by the settings' security role), the configuration manager performs the requested action on the configuration settings. Otherwise (e.g., if the message does not have security privilege to access the settings), the configuration manager fails the transaction. The configuration manager may also rollback the transaction by returning any changed settings to their previous values.

In another aspect, the invention provides for security policies that define certain configuration settings that may only be changed by an entity having a sufficient level of access privilege. The security policies may define certain security-related settings that control the way that the security system operates. A configuration message intended to query or modify those settings must meet a certain level of security privilege. For example, settings that affect a security module portion of the security subsystem may require that a configuration message have administrative privileges before access is allowed.

Advantageously, the present invention provides an added measure of security to the information stored on mobile devices while still providing carriers and provisioning services with access to the device. This benefit can provide users with greater peace of mind and improved mobile device service.

BRIEF DESCRIPTION OF THE DRAWINGS

FIG. 5 is a graphical representation of information within a configuration message used by the security subsystem implementing the present invention.

FIG. 6 is a graphical representation of information stored in a metabase that describes security roles for each of several components within the security subsystem implementing the present invention.

DETAILED DESCRIPTION OF EMBODIMENTS OF THE INVENTION

Illustrative Wireless Environment

Figure 1:
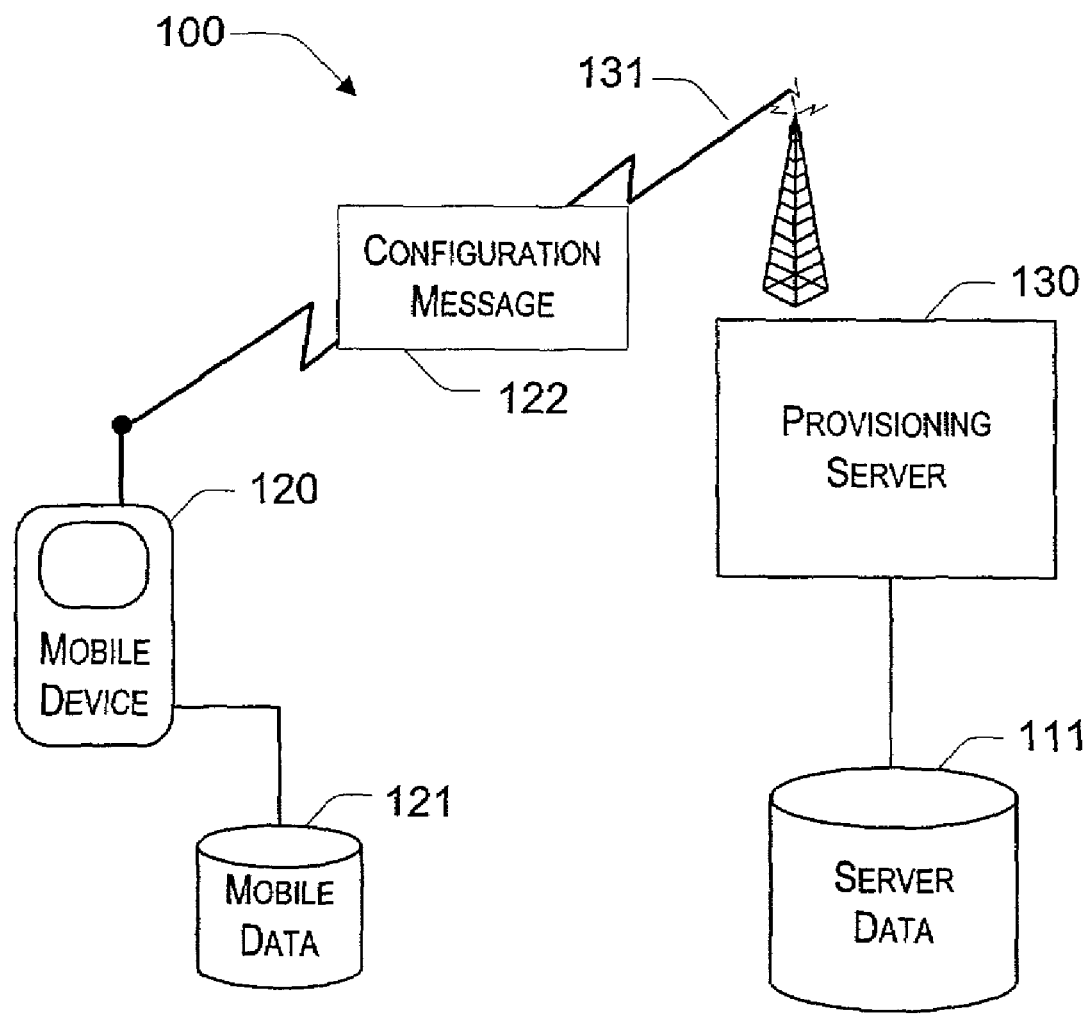
FIG. 1 is a functional block diagram of a wireless environment in which the present invention may be implemented.

FIG. 1 is a functional block diagram of a wireless environment 100 in which the present invention may be implemented. Principally, the wireless environment 100 includes a mobile device 120 in communication with a provisioning server 130 over a wireless link 131.

The provisioning server 130 includes a data store (server data 111) that contains information about the mobile device 120, such as the type and model of mobile device, any installed applications and their versions, service plan information, and the like. The provisioning server 130 may be the principal point of connectivity for the mobile device 120, such as a public wireless service provider (e.g., a cellular carrier) or a private wireless communications network (e.g., a corporate communications network). Alternatively, the provisioning server 130 may be a dedicated provisioning server acting in cooperation with the principal point of connectivity.

Although only one provisioning server 130 is illustrated in FIG. 1, there may be multiple servers in the system 100 that each perform provisioning functions on the mobile device 120. For example, one server (e.g., the provisioning server 130) may be responsible for maintaining device-specific information about the mobile device 130, such as the device's identification or phone number. The may be another server, such as a software vendor's maintenance server, responsible for the maintenance and upgrading of installed software on the mobile device 120. Moreover, there may be yet another server, such as a corporate network server, responsible for maintaining configuration information used by a system for keeping the mobile device synchronized with the corporate network. In short, there may be many sources of provisioning information attempting to access the mobile device 120. It is this accessibility that gives rise to the security concerns described above.

The mobile device 120 is illustrated in detail in FIGS. 2 and 3 and described below. Briefly described, the mobile device 120 is a handheld computing device that includes the functionality of a mobile telephone as well as the functionality of a typical Personal Digital Assistant (PDA). The mobile device 120 may contain an operating system, several installed applications, communications software, and the like. The mobile device 120 also includes a data store (mobile data 121) that contains information used by the mobile device 120 in operation. Configuration settings for many of those components are stored in the mobile data 121.

The provisioning server 130 and the mobile device 120 communicate with each other over a wireless link 131, which may be any means for wireless communications such as a radio frequency link or the like. The provisioning server 130 transmits configuration messages (e.g., configuration message 122) to the mobile device 120 over the wireless link 131. The configuration message is illustrated in detail in FIG. 5 and described below. Briefly described, the configuration message 122 is a markup language document, such as an extensible Markup Language (XML) document, that includes instructions for querying or altering configuration settings stored on the mobile device 120.

Mobile Computing Device Implementing the Present Invention

Figure 2:
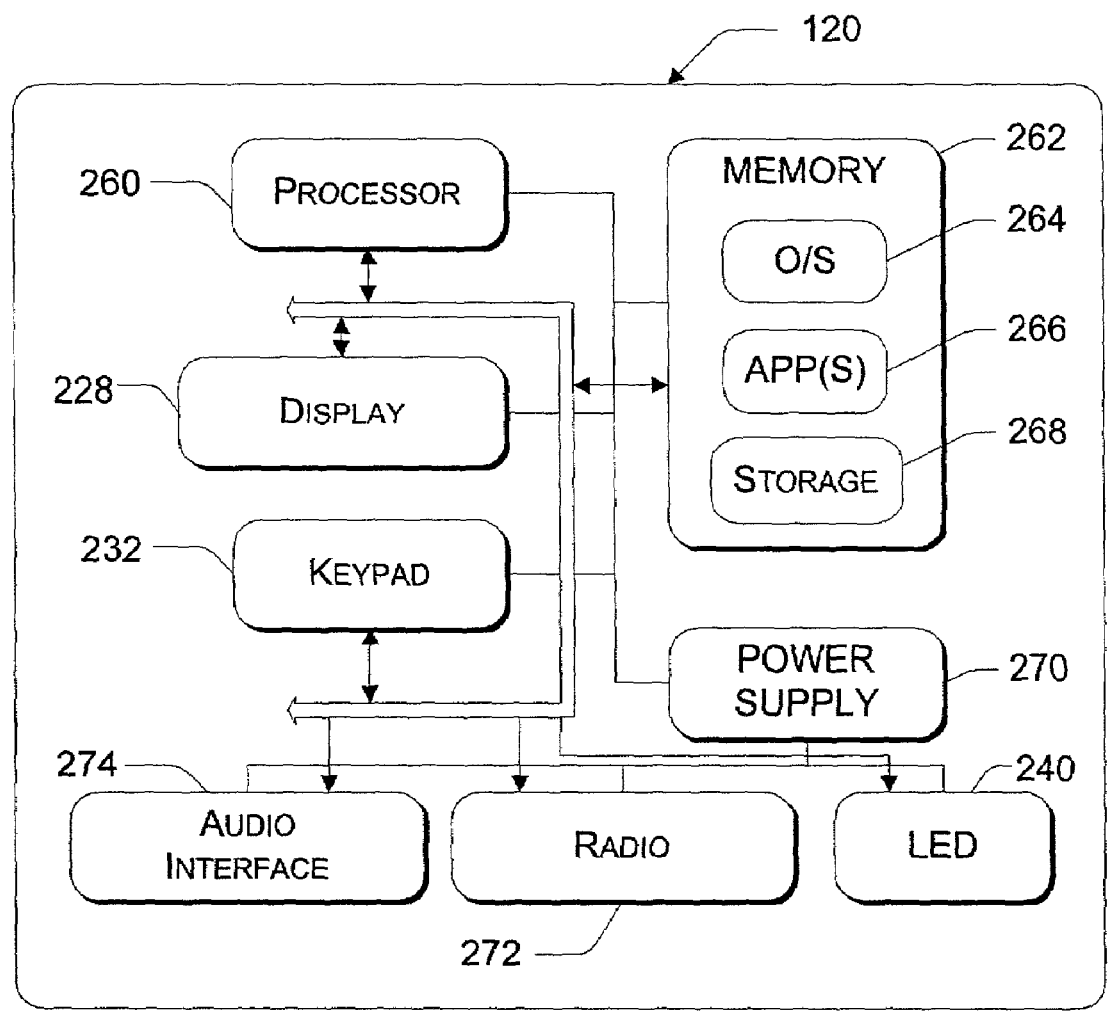
FIG. 2 is a functional block diagram of an illustrative mobile device which may be used to implement one embodiment of the present invention.

FIG. 2 is a functional block diagram illustrating functional components of a sample mobile device 120 adapted for use in one implementation of the present invention. The mobile device 120 has a processor 260, a memory 262, a display 228, and a keypad 232. The memory 262 generally includes both volatile memory (e.g., RAM) and non-volatile memory (e.g., ROM, Flash Memory, or the like). The mobile device 120 includes an operating system 264, such as the Windows CE operating system from Microsoft Corporation or other such operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile device 120 also includes non-volatile storage 268 within the memory 262. The non-volatile storage 268 may be used to store persistent information which should not be lost if the mobile device 120 is powered down. The applications 266 may use and store information in the storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

The mobile device 120 has a power supply 270, which may be implemented as one or more batteries. The power supply 270 might further include an external power source, such as an AC adapter or a powered docking cradle, that supplements or recharges the batteries.

The mobile device 120 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile device 120 also includes a radio 272 that performs the function of transmitting and receiving radio frequency communications. The radio 272 facilitates wireless connectivity between the mobile device 120 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 120 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
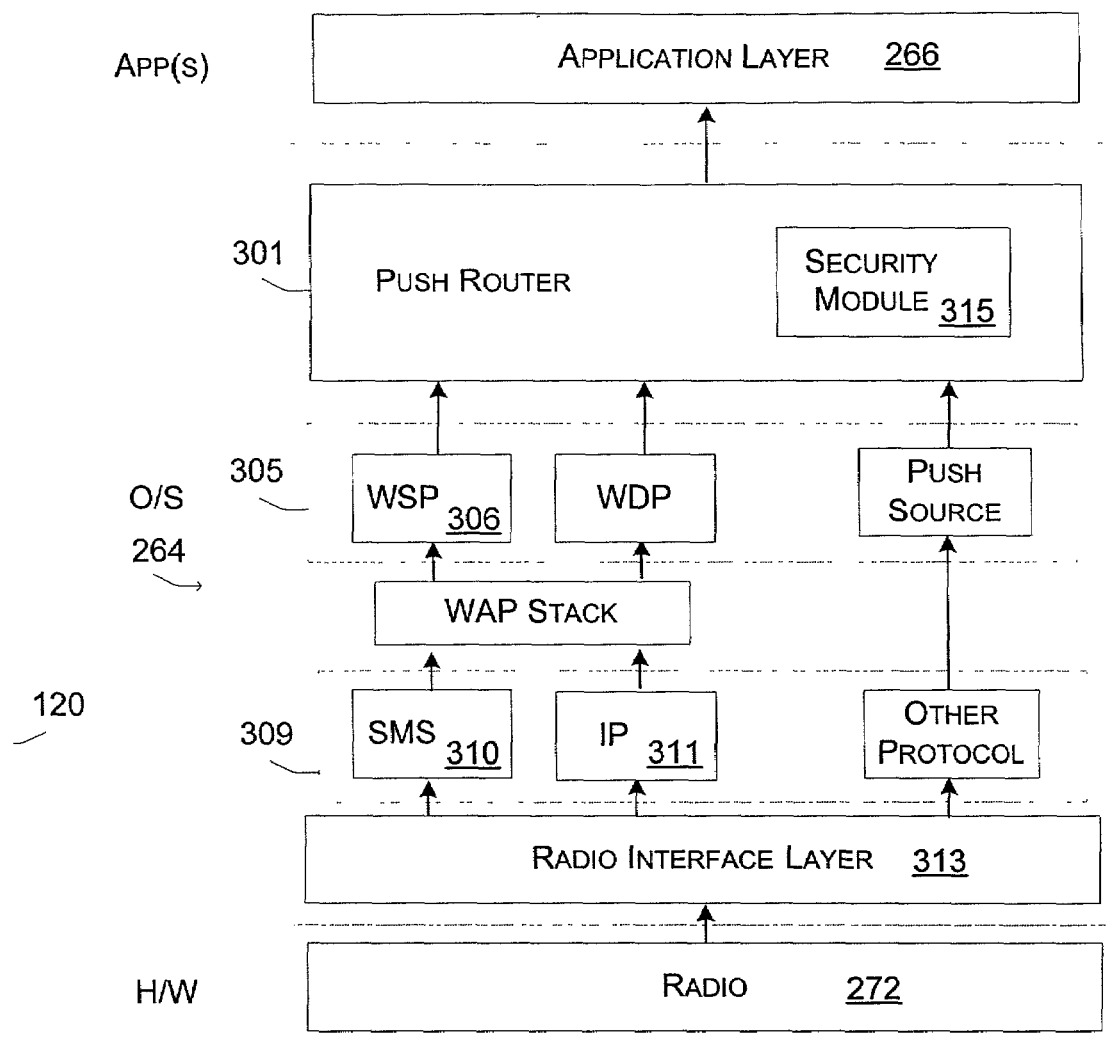
FIG. 3 is a functional block diagram of illustrative software components that implement one embodiment of the present invention.

FIG. 3 is a functional block diagram of illustrative software components on the mobile device 120 that implement the present invention. This implementation of the invention is described in the general context of computer-executable instructions or components, such as software modules, being executed on a mobile computing device. Generally, program modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

FIG. 3 shows the radio 272, the applications 266, and, in greater detail, portions of the operating system 264. It will be appreciated that although several components are illustrated as portions of the operating system 264, it is possible to implement the functionality of those components outside of the operating system 264, such as in the application layer 266. The several illustrated components of the operating system 264 include a push router 301, push sources 305, a transport layer 309, and a radio interface layer 313. Essentially, the radio 272 and the radio interface layer 313 act in concert to transmit and receive messages, including configuration messages. The radio interface layer 313 is a software component that interfaces with the radio hardware (radio 272) and exposes a common set of software functions to the other components of the operating system 264. In this way, developers may create software to take advantage of any type of radio hardware by interacting with the common interfaces presented by the radio interface layer 313, rather than directly with the radio 272. This functionality greatly simplifies the task of developing software for use with practically any radio hardware.

The transport layer 309 includes one or more transports that are configured to pass messages to and receive messages from the radio interface layer 313 in one or more communications protocols. For example, the SMS transport 310 is programmed to receive and transmit messages formatted using the Simple Messaging Service (SMS) protocol. Similarly, the IP transport 311 is programmed to receive and transmit messages formatted using the Internet Protocol (IP). Other transports may also be used, as will be understood by those skilled in the art, and the transports shown are for illustrative purposes only.

The push sources 305 are software components that are configured to receive messages from a corresponding transport and make the message available to the push router 301. In this implementation of the invention, configuration messages may be delivered over any one or more of the transports, such as the SMS transport 310, and presented to the push router 301 using any one or more of the push sources, such as the WSP push source 306.

The push router 301 is a software component configured to receive incoming messages from each of the push sources 305 and to route the incoming messages to the proper application registered to receive them. For example, an e-mail application in the application layer 266 may be registered to receive messages delivered over the SMS transport 310. Thus, as messages are received over the SMS transport 310, the WSP push source 306 makes them available to the push router 301, which in turn passes them to the registered e-mail application. Incoming messages that carry provisioning information are received by the push router 301. The push router 301 includes procedures to decompose and parse the received messages into constituent parts to identify a target application. Moreover, the push router 301 is configured to transmit messages over the transports in response to application requests.

The push router 301 includes a security module 315 responsible for performing certain security validation functions on incoming messages. For example, the security module 315 performs authentication and decryption on incoming messages to identify the source of the message. The authentication and decryption of the message may be performed based on existing authentication schemes, such as the Public Key Infrastructure (PKI) scheme. Through the use of the security module 315, the push router 301 is able to accurately identify the source of each message received by the mobile device 120. For example, a configuration message 122 may be transmitted from the provisioning server 130 (FIG. 1) to the mobile device 120 over the SMS transport 310 (FIG. 3). The configuration message 122 includes information (e.g., a shared key) that accurately identifies the provisioning server 130 as the source of the configuration message 122.

The security module 315 is also configured to assign a security role to each incoming message based on the source of the message and possibly an encryption key used to decrypt the message content. In this context, security roles are essentially security credentials that define the scope of trust assigned to messages received from a particular source. The assignments of security roles to message source are stored in a metabase of information available to the security module 315. As will be described in greater detail later, the security roles attached to each configuration message are compared to corresponding security roles assigned to the target resources (e.g., configuration settings) to determine whether the source of the configuration message is trusted to access the target resources.

Defined Security Roles

In one actual implementation, security roles are assigned to messages in accordance with the following descriptions.

Carrier Trusted Provisioning Server (TPS)

This security role allows settings to be changed that are owned by TPS. This security role is assigned to a change request or query originating from a TPS that was made trusted by a bootstrap provisioning document. The Carrier TPS is the de facto carrier until a carrier shared secret key has been established with another server. When a shared key is established with another carrier server, the mechanism by which the carrier TPS is assigned is disabled.

Carrier

This security role allows settings to be changed that are owned by the carrier. This security role is assigned to a change request or query originating from a carrier server that has been identified using a negotiated shared secret key.

Manager

This security role allows settings to be changed on the device that pertain to the ownership of the device. A device can be owned by a corporation/organization, or an individual (e.g., if the owner in not a corporation then the user is manager). Manager is assigned to a user or a corporation at purchase or lease time of the mobile device. Manager should be able to assign and change the carrier. Only manger can assign new manager and give up the privilege. Only one entity can hold the manager role assignment at any given time.

User-Authenticated

All Change requests from control panel run with this security role. Settings can be changed by the user initially using this security role. This is also a "bucket" role assigned to a request coming from a server which has a negotiated shared secret key but does not fit in the roles above (e.g., is not a carrier and is not from a corporation provisioning server).

User-Unauthenticated

This security role is assigned to configuration messages that come from a server that does not have a shared secret key established with the client, are not signed and are not encrypted. This security role represents the most limited security credentials.

In summary, returning to FIG. 3, a message received by the transports 309 is passed to the push router 301 by the push sources 305. The push router 301, through the security module 315, authenticates and assigns the message a security role based on the source of the message. Once a security role has been assigned to the message, it is passed to an application 266 registered to receive the message. In this implementation, it is the application's responsibility to enforce the security roles.

Figure 4:
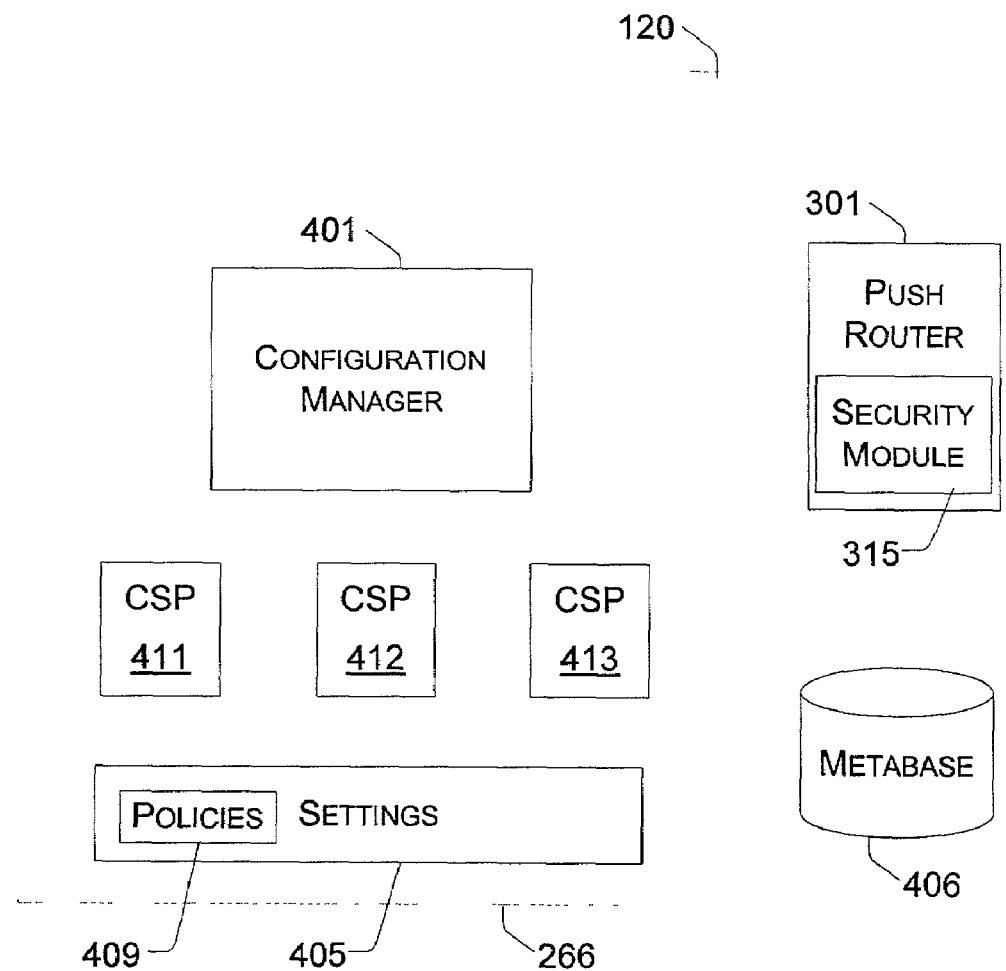
FIG. 4 is a functional block diagram illustrating in greater detail certain software components that operate within the application layer of the embodiment of the invention illustrated in FIG. 3.

FIG. 4 is a functional block diagram illustrating in greater detail certain software components that operate within the application layer 266. In this embodiment, system settings 405 are shown within the application layer 266 for simplicity. It will be appreciated that the settings may reside in multiple places, such as in the application layer 266 and the operating system 264. The several settings may be grouped or associated with one or more other components. In this implementation, each setting or group of settings is assigned a security role, just as each message source is assigned a security role. In this context, the security role essentially identifies the level or quality of privileges that are required to modify the settings. Settings may also be mapped to multiple security roles. A default security role may be assigned to each new setting, which may be modified by a user, carrier, provisioning server, or the like. For instance, the default security role may be the User Authenticated level of security, and may be changed later by a trusted source. The security role assignments for the settings are stored in a metabase 406.

The several settings 405 are each associated with a Configuration Service Provider (CSP) 411–413. Each CSP 411–413 is essentially a special-purpose software module that is responsible for maintaining a particular group of settings. The CSPs 411–413 are trusted components that may query, alter, or delete the settings for which they are responsible. For instance, one application, such as an e-mail application, may have a dedicated CSP (e.g., CSP 411) for maintaining settings associated with the e-mail application. In this implementation, each CSP 411–413 also has a security role assigned to it just as the message sources and the settings have assigned security roles. As with the settings, there may be a default security role that is assigned to each new CSP which may then be modified. The CSP security roles may also be stored in the metabase 406.

One application, a configuration manager 401, is registered to handle configuration messages for the mobile device 120. As mentioned above, the push router 301 passes received messages to one or more applications 266 that are registered to receive them. In this case, the configuration manager 401 is the application registered to handle configuration messages. Thus, when the push router 301 receives a configuration message, after authenticating the message and attaching the appropriate security role, the push router 301 passes the message to the configuration manager 401.

The configuration manager 401 is programmed to parse the incoming configuration messages to identify the affected configuration settings. For example, one configuration message may contain changes to settings related to an e-mail application, while another configuration message may contain changes to settings related to the addresses of trusted proxy servers. Moreover, a single configuration message may contain changes that affect several different groups of settings. The configuration manager 401 is programmed to determine, from information in the configuration message, which one or more CSPs are responsible for maintaining the affected settings. The configuration message may directly identify the responsible CSP 411–413, or may only identify the affected settings, leaving the task of determining which CSP is responsible to the configuration manager 401.

The configuration manager 401 is also programmed to determine whether the CSPs responsible for the affected settings have a security role that corresponds to the security role attached to the configuration message. The configuration manager 401 may query the metabase 406 to make that determination. Thus, if a configuration message reveals that a particular CSP should be invoked to handle changes to settings, prior to passing the configuration message to the CSP, the configuration manager 401 verifies that the particular CSP and the configuration message have corresponding security roles. As an added measure of security, the particular CSP also verifies that the configuration message has a security role that corresponds to the security roles of the affected settings. As with the configuration manager 401, the CSP may query the metabase 406 to determine the security role assigned to the affected settings and compare that security role to the one attached to the configuration message. Only if the two are in agreement does the CSP actually modify the settings.

Certain of the settings 405 may be identified as "policy" settings 409. The policy settings 409 are special settings that may describe special functionality of the mobile device, such as the behavior of the security system itself, and which may only be modified by a highly-trusted source, such as an administrator. Alternatively, the policy settings could indicate that they may only be modified locally, and not through the use of a configuration message received over wireless communication. The policies help a wireless operator or manager manage the mobile device more effectively. The policies provide a reliable way of restricting the mobile device 120 to certain initial browse points, enable or disable the setup of trust relationships with new provisioning servers, and enforce restrictions that apply to untrusted CSPs, for example. In one actual implementation, security policies are defined in accordance with the following descriptions.

Security Module Policies

These policies define the security-relevant behavior in the security module 315. The security module policies that affect assigning roles include disabling assigning carrier TPS role. The policies for end-to-end push framework include: disable receiving any IBP messages; set trusted server list and untrusted server list (only one list is enabled at any one time); the trusted server means that the device can accept IBP messages from this server. Additional security module policies include: set the list of security algorithms the device is allowed to accept; and set a minimum key length. UI-related policies that affect the security module include: set the retry times that the user is permitted to enter the authentication code during the authentication procedure.

Push Router Policies

By using the push router policies the carrier/manager can disable OTA configuration entirely or just particular push sources and thus support only a particular way of OTA configuration and provisioning. The push router policies also provide the ability to disable a particular delivery route within push sources capable of supporting more than one delivery route. For example, the entire WDP push source can be disabled or only routing of WDP notifications received from WAP stack over UDP can be disabled—leaving the WDP notifications over SMS open.

The following is a list of supported policies in push router.

Disable all OTA Configuration and provisioning (disables all OTA push sources. Bootstrap and provisioning can be done only at service points and by physical access to the device)

Disable WDP Push Source
Disable routing of WDP notifications from WAP stack over SMS.
Disable routing of WDP notifications from WAP stack over UDP.

Disable WSP Push Source
Disable accepting of WSP push notifications

Disable routing to untrusted client applications

Disable HTTP push source

Disable Push to Pull Source

Disable SIM file push source

Disable Local File Push acceptor.

Disable Response generation by not forwarding the response headers
Disable send response documents over SMS
Disable send response documents using HTTP POST Disable routing of unauthenticated messages Configuration Manager Policies The following polices are used in one actual implementation of the invention to affect the configuration manager: Notification Policies to enable or disable a successful update notification so that users will or will not receive a message in their inbox. Response Policies to enable or disable a long response, or to enable or disable the addition of metadata to long responses. In addition, CSP policies may enable or disable the instantiation of untrusted CSPs. These policies may be global for the system and so would affect all CSPs equally.

Sample Documents Used by the System

FIG. 5 is a graphical representation of what a configuration message may look like. As mentioned above, the typical configuration message 122 is an XML document that includes tags that define changes to settings on the mobile device. The configuration message 122 may include header information 510 that identifies a particular version of the system being used, such as a configuration management system version. In addition, the header information 510 may identify the source of the configuration message and the particular transport being used (the provisioning server and the SMS transport in this example). The configuration message 122 also identifies the particular configuration changes that are being made by the message. The example configuration message 122 includes a change to "Setting One" 512 and a change to "Setting Two" 514 on the mobile device.

After the configuration message 122 has been authenticated by the security module 315 (FIG. 3), the assigned security role may be included in the message. Example configuration message 122 includes a security role 516 of "X" which may be a number corresponding to a particular security role. Each defined security role may be represented by a number. The push router may assign the security roles defined above to incoming configuration messages using the following definitions:

| x | Security role |
|---|---|
| 1 | Carrier trusted provisioning server (TPS) |
| 2 | Carrier |
| 3 | Manager |
| 4 | User-authenticated |
| 5 | User-unauthenticated |

FIG. 6 is a graphical representation of what information stored in the metabase 406 may look like. In this implementation, there are three mappings of security roles to components. First, there is a mapping 601 for security roles that are assigned to each known source of configuration messages, such as the provisioning server 130 (FIG. 1). There is another mapping 603 of security roles for each CSP that may be in the system. And there is another mapping 605 of security roles for each setting or group of settings that may be in the system.

Illustrative Process for Applying Security Roles

Figure 7:
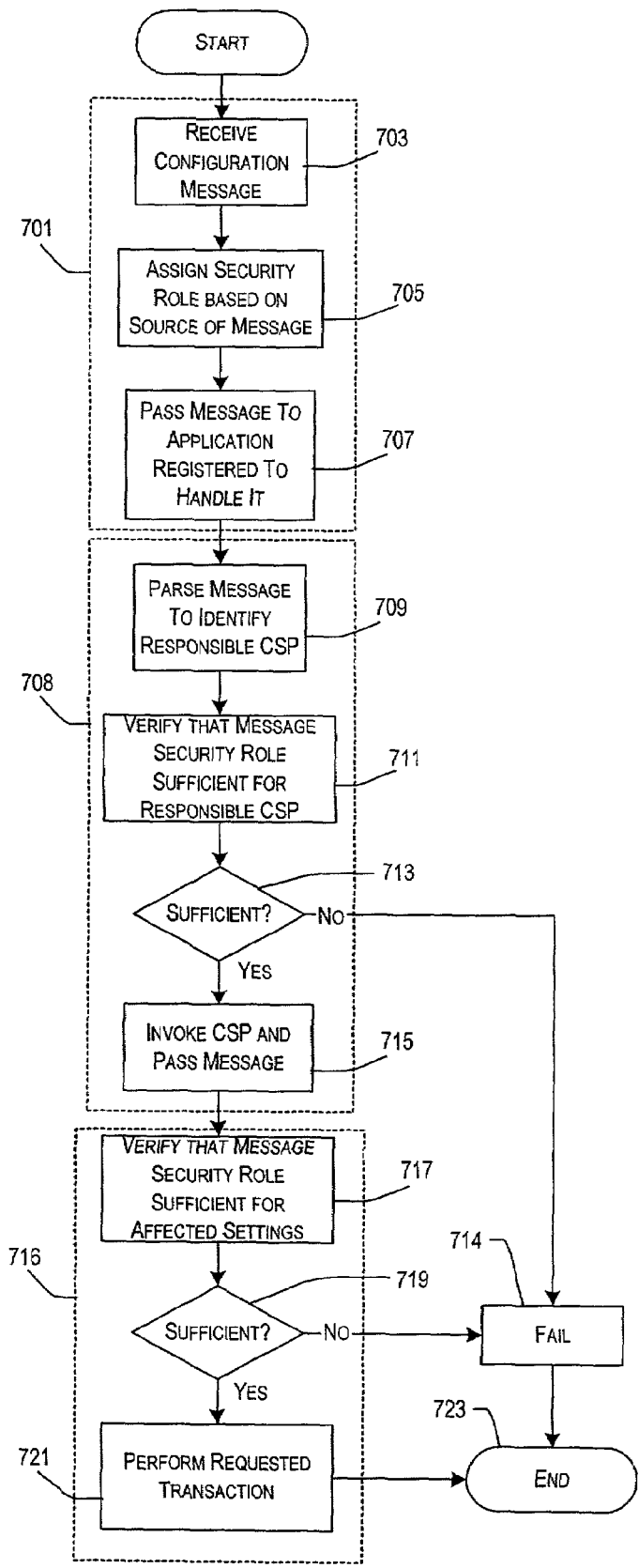
FIG. 7 is a logical flow diagram generally summarizing a process for applying security roles to configuration messages used in a mobile device.

FIG. 7 is a logical flow diagram generally summarizing a process for applying security roles to configuration messages used in a mobile device. Although illustrated as a single flow chart, operations performed at various stages of the process may be performed by different components within the system. For example, referring to FIG. 7, the operations performed at the blocks within the dashed-line box 701 may be performed by the push router 301 described above. Similarly, the operations performed at the blocks within the dashed-line box 708 may be performed by the configuration manager 401. And the operations performed at the blocks within the dashed-line box 716 may be performed by a CSP 411–413.

To begin, at block 703 a configuration message is received. The configuration message identifies its source and certain configuration transactions to be performed. At block 705, a security role is assigned to the message based on the source of the message. The source of the message may be determined through traditional authentication techniques. The security role assigned to the message corresponds to security credentials that have been pre-selected for the source of the message. At block 707, the message (including security role) is passes to an application registered to handle the configuration transaction.

At block 709, the message is parsed to identify a CSP that is responsible to perform the requested configuration transaction. At block 711, a verification is performed to determine if the security role of the message is sufficient to invoke the identified CSP. As mentioned, each CSP has its own security role. If the security role of the message is insufficient, the transaction fails at block 714 and the configuration transaction is rolled back by returning any changed settings to their previous values. If the security role of the message is sufficient, the responsible CSP is invoked and passed the configuration message at block 715. To optimize performance, querying and mapping of the CSP role assignments and the message role assignments occurs before any processing is done by any of the CSPs. If a mismatch between the role assignments is found the transaction fails.

At block 717, a verification is performed to determine if the security role of the message is sufficient to access the affected settings. As mentioned, each setting or group of settings has its own security role. If the security role of the message is insufficient, the transaction fails at block 714 and the configuration transaction is rolled back. However, if the security role of the message is sufficient, the CSP performs the requested configuration transaction at block 721. The process then ends at block 723.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for maintaining configuration information on a mobile device, comprising:
    receiving a message, wherein the message identifies the source of the message and changes to settings of the mobile device;
    identifying, by a push router of the mobile device, the source of the received message, wherein the push router assigns a security role to the received message based on the identified source of the received message and inserts an identifier into the received message to identify the assigned security role;
    passing the message to a configuration manager;
    parsing, by the configuration manager, the message to identify at least one configuration service provider, among a plurality of configuration service providers, responsible for the settings identified in the message;
    determining whether the assigned security role of the message, assigned by the push router, is sufficient to invoke the identified configuration service provider;
    failing the transaction when the assigned security role of the message is not sufficient;
    passing the message to the configuration service provider when the assigned security role of the message is sufficient, wherein the identified configuration security provider determines whether the assigned security role of the message is sufficient for settings associated with the configuration service provider;
    failing the transaction when the assigned security role of the message is insufficient for the settings; and
    performing the changes to the settings of the mobile device when the configuration service provider determines that the security role of the message is sufficient.

2. The computer-implemented method of claim 1, wherein the source of the message is identified from authentication and decryption of the received message.

3. The computer-implemented method of claim 1, wherein the message includes a shared key that identifies the source of the message.

4. The computer-implemented method of claim 1, wherein determining whether the assigned security role of the message, assigned by the push router, is sufficient to invoke the identified configuration service provider further comprises comparing the assigned security role of the message to an assigned security role of the configuration service provider.

5. A computer-readable storage medium having computer-executable components for managing security on a mobile device, comprising:
    a stored setting having an assigned security role that identifies a privilege that an entity attempting to access the stored setting must satisfy in order to access the stored setting;
    a router, of the mobile device, configured to receive a configuration message over a wireless communication link, the router being further configured to identify a source of the configuration message and insert a security role identifier into the received configuration message based on the identified source, the router being further configured to pass the configuration message to other components of the mobile device, the configuration message including an instruction that affects a configuration setting;
    a configuration manager, of the mobile device, configured to receive the configuration message from the router and to parse the configuration message to identify a configuration service provider, of the mobile device, responsible for the instruction, wherein the configuration manager passes the configuration message to the configuration service provider when the assigned security role of the configuration message provides a privilege to access the configuration service provider; and
    the configuration service provider being configured to receive the configuration message from the configuration manager, determine whether the assigned security role of the configuration message has sufficient privilege to access the stored setting[s], and execute the instructions when the configuration service provider determines that the assigned security role has sufficient privilege to access the stored setting.

6. The computer-readable storage medium of claim 5, wherein the configuration service provider is configured to manage at least one configuration setting stored on the mobile device, and wherein the processing of the instruction is performed by the configuration service provider.

7. The computer-readable storage medium of claim 6, wherein the configuration service provider has an assigned security role that identifies a privilege that must be associated with an instruction that affects a configuration setting which the configuration service provider maintains.

8. The computer-readable storage medium of claim 7, wherein the configuration manager is further configured to determine if the instruction that affects the configuration setting is in agreement with the security role assigned to the configuration service provider that maintains the affected configuration setting, and if so, the configuration manager is further configured to pass the instruction to the configuration service provider to be handled.

9. The computer-readable storage medium of claim 8, wherein the configuration service provider determines if the instruction is in agreement with the security role assigned to the stored setting prior to processing the instruction, and if not, terminating the processing of the instruction.

10. A computer-readable storage medium having computer-executable instructions for maintaining configuration information on a mobile device, comprising:
    receiving a configuration message, wherein the configuration message includes a header field that identifies a source and an instruction field that identifies a configuration setting on the mobile device;
    identifying, by a push router of the mobile device, the source of the received configuration message from the header field, wherein the push router inserts a security role identifier into a security role field of the received configuration message, wherein the security role is based on the identified source of the received configuration message;
    passing the configuration message to a configuration manager of the mobile device;

parsing, by the configuration manager, the configuration message to identify at least one configuration service provider of the mobile device, among a plurality of configuration service providers, responsible for the setting identified in the configuration message;

determining whether the inserted security role identifier of the configuration message, assigned by the push router, is sufficient to invoke the identified configuration service provider;

failing the transaction when the inserted security role identifier of the configuration message is not sufficient;

passing the message to the configuration service provider when the inserted security role identifier of the configuration message is sufficient, wherein the identified configuration security provider determines whether the inserted security role identifier of the configuration message is sufficient for the setting associated with the configuration service provider;

failing the transaction when the inserted security role identifier of the configuration message is insufficient for the setting; and performing changes to the setting of the mobile device when the configuration service provider determines that the inserted security role identifier of the configuration message is sufficient.

11. The computer-readable storage medium of claim 10, wherein the source of the message is identified from authentication and decryption of the received message.

12. The computer-readable storage medium of claim 10, wherein the configuration message includes a shared key that identifies the source of the configuration message.

13. The computer-readable storage medium of claim 10, wherein determining whether the inserted security role identifier of the configuration message, assigned by the push router, is sufficient to invoke the identified configuration service provider further comprises comparing the inserted security role identifier of the configuration message to an assigned security role of the configuration service provider.

* * * * *